United States Patent [19]

Schultenkamper et al.

[11] 4,053,248
[45] Oct. 11, 1977

[54] COUPLING FLANGE FOR A TORQUE TRANSMITTING SHAFT

[75] Inventors: Josef Schultenkamper, Essen; Bernd Eckert, Bruchkoebel; Siegfried Schumann, Essen, all of Germany

[73] Assignee: Gelenkwellenbau GmbH, Essen, Germany

[21] Appl. No.: 747,226

[22] Filed: Dec. 3, 1976

[30] Foreign Application Priority Data

Dec. 4, 1975 Germany ..................... 2554574

[51] Int. Cl.² ........................................... F16D 1/00
[52] U.S. Cl. ................................. 403/337; 403/97; 64/9 R; 285/328
[58] Field of Search .............. 403/335, 336, 337, 338, 403/364, 97, 100, 102; 64/9 R, 14 R; 285/24, 27, 328, 330

[56] References Cited

U.S. PATENT DOCUMENTS

| 958,927 | 5/1910 | Kelly | 285/328 X |
| 1,119,077 | 12/1914 | Geselbracht | 403/337 X |
| 1,348,667 | 8/1920 | Snyder | 285/328 |
| 1,545,221 | 7/1925 | Watson | 403/337 X |
| 1,781,032 | 11/1930 | Redfield | 403/337 X |
| 2,879,092 | 3/1959 | Hargrove et al. | 403/337 |
| 3,287,031 | 11/1966 | Simmons et al. | 285/27 |

FOREIGN PATENT DOCUMENTS

| 380,454 | 9/1964 | Switzerland | 403/337 |
| 824,931 | 12/1959 | United Kingdom | 403/337 |

*Primary Examiner*—Wayne L. Shedd
*Attorney, Agent, or Firm*—Edmund M. Jaskiewicz

[57] ABSTRACT

A coupling flange on a torque transmitting shaft or the like for coupling in face-to-face relationship with a counter-flange has at least two tooth systems on its coupling surface and each system comprising a plurality of substantially parallel axially projecting teeth having inclined flanks. At least one tooth in each tooth system has a different height, spacing or shape from the other teeth in the tooth system and the tooth systems are engagable with a complementary configuration on the counter-flange so as to connect nonrotatably the flanges.

6 Claims, 9 Drawing Figures

COUPLING FLANGE FOR A TORQUE TRANSMITTING SHAFT

The present invention relates to a coupling flange for a torque transmitting shaft or the like, more particularly, to the rigid but detachable coupling of a flange to a counter-flange in aligned relationship.

The ends of power transmission shafts, such as cardan shafts, are provided with coupling flanges to be connected to counter-flanges. The mutual flanges are securely but detachably connected by screws or bolts and each flange is generally provided with a series of teeth or a tooth system with the teeth being arranged in at least two groups of relatively parallel axially projecting teeth having inclined flanks or side walls. The use of such flange couplings enables an increase in the torque or power to be transmitted or a reduction in the number or physical properties of the screws or bolts used.

Such coupling flanges which interengage by means of meshing tooth formations have the disadvantage that misalignment of the coupling flanges may readily occur in the assembly of the flanges so that considerable care and attention on the part of the personnel must be taken to insure that the bolt holes will be precisely aligned.

Another form of such coupling flanges has the disadvantage that the concentric teeth employed for alignment of the flanges were difficult to make since a separate machining operation was required for making each annular tooth.

It is therefore the principal object of the present invention to provide coupling flanges with interengaging or meshing teeth having an improved structure for facilitating the alignment and assembly of the coupling flanges.

It is another object of the present invention to provide such coupling flanges which can be readily fabricated at economically feasible costs by relatively inexpensive metal working operations.

The present invention essentially provides that at least one tooth in each group of teeth on a coupling flange is differently spaced with respect to the remaining teeth of that group and the cooperating counter-flange has a complementary configuration and/ or in each group of teeth the height, or elevation of at least one tooth is different from that of the remaining teeth with the counter-flange having a complementary shape.

According to one aspect of the present invention a flange particularly on a torque transmitting shaft or the like for rigidly but detachably coupling to a counter-flange may comprise a coupling plate having a coupling surface engagable face-to-face with a counter coupling flange and having a plurality of openings through which are passed screws or bolts. Each coupling surface has two tooth systems thereon and each comprises a plurality of substantially axially projecting teeth having inclined flanks. At least one tooth in each tooth system has a different height, spacing or shape from the other teeth in the system and the tooth systems are engagable with a complementary configuration on the counter-flange to connect nonrotatably the flanges.

Other objects and advantages of the present invention will be apparent upon reference to the accompanying description when taken in conjunction with the following drawings, which are exemplary, wherein.

Proceeding next to the drawings wherein like reference symbols indicate the same parts throughout the various views a specific embodiment and modifications of the present invention will be described in detail.

Figure 1:
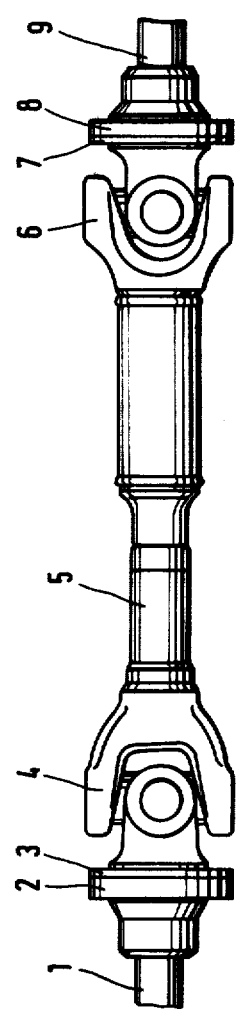
FIG. 1 is an elevational view of a power transmission shaft having coupling flanges according to the present invention.

As may be seen in FIG. 1, a shaft 1 which may be a drive shaft has a flange 2 which is coupled to a coupling flange 3 of a power transmission shaft having a universal joint 4 and a telescoping or sliding tubular connection 5 at the other end of which is a universal joint 6 having a coupling flange 7. The flange 7 is coupled to a flange 8 which is mounted on the end of a shaft 9 which may be a driven or output shaft.

The coupling flanges 3 and 7 which are components of the power transmission or cardan shaft are each provided with two tooth systems 10 or the coupling surfaces for meshing or inter-engaging with corresponding or complementary configurations on the counter-flanges 2 and 8 respectively mounted on the shafts 1 and 9. The flanges 3 and 7 and the counter-flanges 2 and 8 are provided with correspondingly positioned openings as may be seen in FIG. 2 through which screws, bolts or other suitable detachable fastener elements are passed. The tooth systems 10 provide for concentric alignment of the coupled flanges.

Figure 2:
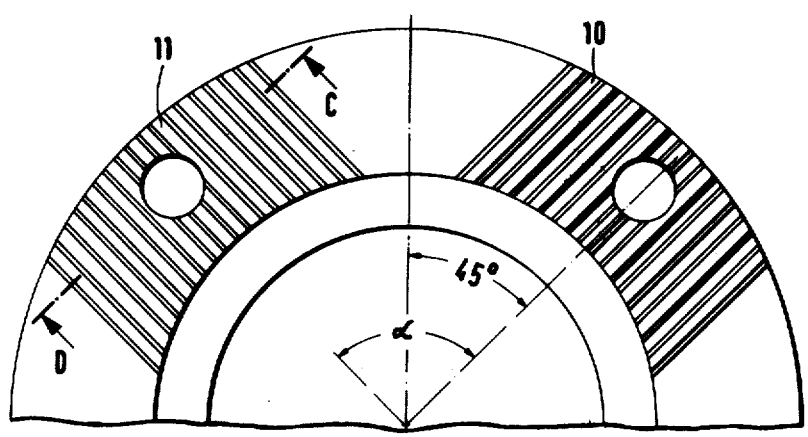
FIG. 2 is an elevational view of a coupling flange of the present invention having variable tooth spacing.
Figure 3:
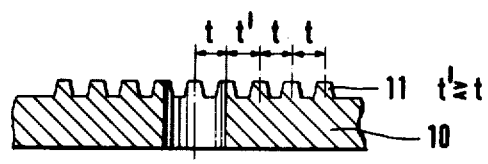
FIG. 3 is a sectional view taken along the line C-D in FIG. 2.

As may be seen in FIGS. 2 and 3, a tooth system or formation 10 comprises a plurality of substantially parallel teeth 11 which are axially extending and which have sloping or inclined flanks as may be seen in FIG. 3. All of the teeth 11 in a single group 10 are made in the course of a single reaming pass. The teeth of one system are arranged at right angles with respect to the teeth of the other system and the teeth of each system are spaced apart by a distance $t$. In order to provide for reliable and precise concentric alignment of the mutually cooperating flanges 2,3 and 7,8, according to the present invention at least one tooth 11 in each tooth system has a different spacing with respect to the other teeth in that system. This different spacing is at a distance $t'$ which may be greater or less than the spacing $t$ of the remaining teeth in that system. As a result, during assembly and coupling of the cooperating flanges the bolt or screw or holes are readily and precisely aligned without any difficulty and with a minimum of effort by the personnel.

Figure 4:
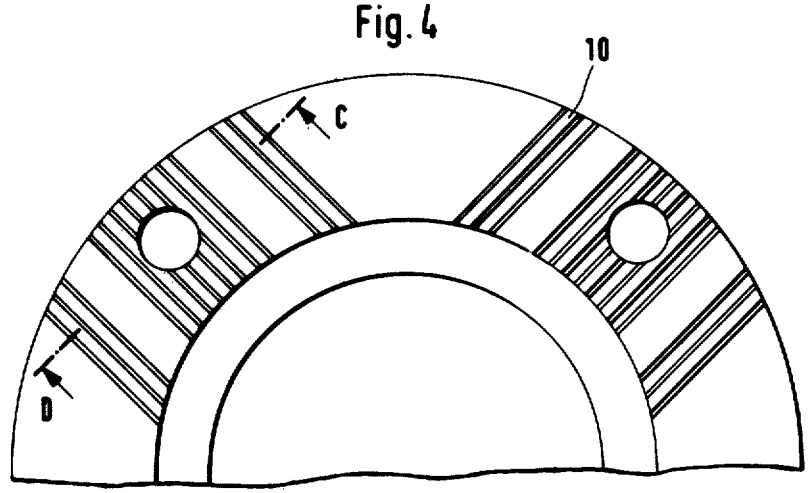
FIG. 4 is a view similar to that of FIG. 2 but showing a different form of tooth spacing.
Figure 5:
FIG. 5 is a sectional view taken along the line C-D in FIG. 4.

In FIGS. 4 and 5, the coupling flange is similar to that of the flange shown in FIGS. 2 and 3 but is provided with a wider spacing $t'$ attained by omitting one groove or gap base 12. One or more grooves or gaps can be omitted in a tooth system to achieve the effect as shown in FIGS. 4 and 5.

Figure 6:
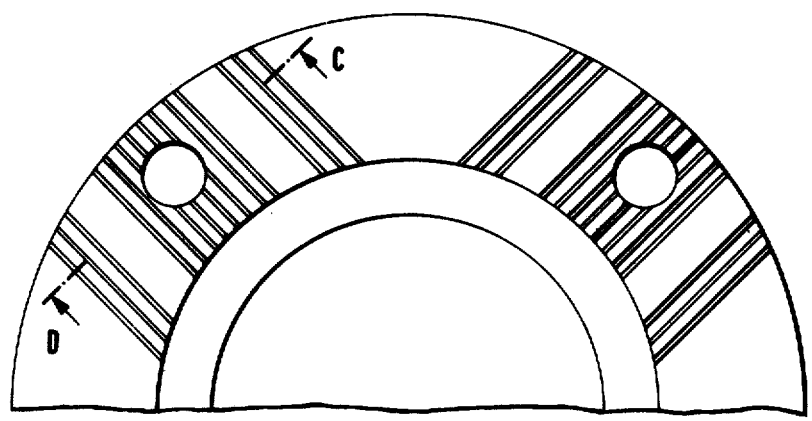
FIG. 6 is a view similar to that of FIG. 2 but showing a tooth system wherein a tooth in the system has a different height.
Figure 7:
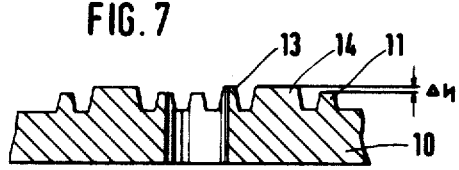
FIG. 7 is a sectional view taken along the line C-D of FIG. 6.

In FIGS. 6 and 7, the concentric alignment is obtained by increasing the elevation or height of a tooth 13 or of a group of teeth at 14 so that the teeth 13 and 14 have a height greater than that of the other teeth 11 in a system by the amount as shown in FIG. 7.

The advantages of the structures as described above with respect to FIGS. 2–7 is that the teeth on a flange coupling can be easily fabricated by reaming or milling operation. All of the teeth of a tooth system are formed by a single operating pass which thus avoids the danger of misalignment of any teeth in the group. On the other hand, the different spacing of the teeth in a group assures accurate concentric alignment which results in a simple and reliable assembly and coupling of the flanges. The difference in spacing is easily achieved merely by omitting a space between teeth. It is also apparent that the same advantages are obtained if in addition to the different spacing between the teeth the height of one tooth differs from the heights of the other teeth in a system. It is also possible to have the same spacing between teeth but one of the teeth at a different height.

Figure 8:
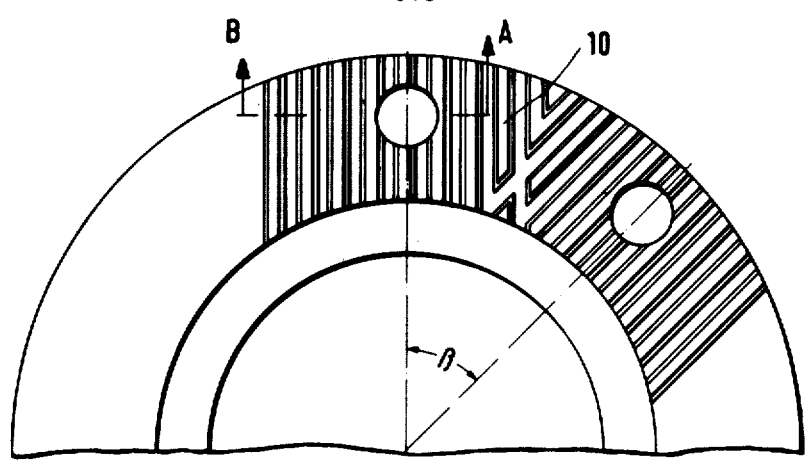
FIG. 8 is a view similar to that of FIG. 2 and showing two tooth systems defining an angle therebetween of less than 90°.
Figure 9:
FIG. 9 is a sectional view taken along the line A-D of FIG. 8.

The coupling flange shown in FIGS. 8 and 9 has two tooth systems 10 but the teeth of one system extend at an angle of less than 90° with respect to the teeth of the other system. This angular relationship between the teeth of the different systems will assure perfect and precise concentric alignment. In addition, teeth of the two systems intersect as shown in FIG. 8 and this intersecting relationship assists in the concentric alignment of the coupling flanges. In the tooth structure of FIG. 8, all of the teeth of a group may be of the same size, shape and spacing but the angular relationship of the two tooth systems will still provide for ready concentric alignment of the coupling flanges.

It will be understood that this invention is susceptible to modification in order to adapt it to different usages and conditions, and accordingly, it is desired to comprehend such modifications within this invention as may fall within the scope of appended claims.

What is claimed is:

1. A flange, particularly on a torque transmitting shaft or the like, for rigidly but detachably coupling to a counter-flange and comprising a coupling plate having a coupling surface engagable face-to-face with a counter-coupling flange and there being a plurality of openings through said coupling plate to receive detachable fastener elements, said coupling surface having two tooth systems thereon each comprising a plurality of substantially parallel axially projecting teeth having inclined flanks, at least one tooth in each tooth system having one of a different height, spacing and shape from the other teeth in said system and said tooth systems are engagable with a complementary configuration on a counter-flange to connect nonrotatably the flanges.

2. A flange as claimed in claim 1 wherein at least one tooth in each tooth system has both a different height and spacing.

3. A flange as claimed in claim 1 wherein the teeth of one tooth system define an angle with the teeth of the other tooth system on said coupling flange.

4. A flange as claimed in claim 3 wherein said angle is a right angle.

5. A flange as claimed in claim 3 wherein said angle is less than 90°.

6. A flange as claimed in claim 5 wherein the teeth of one tooth system intersect the teeth of the other tooth system.

* * * * *